(12) United States Patent
Pilutti et al.

(10) Patent No.: US 9,335,765 B2
(45) Date of Patent: May 10, 2016

(54) AUTONOMOUS VEHICLE MEDIA CONTROL

(71) Applicant: Ford Global Technologies, LLC, Dearborn, MI (US)

(72) Inventors: Thomas Edward Pilutti, Ann Arbor, MI (US); Matthew Y. Rupp, Canton, MI (US); Roger Arnold Trombley, Ann Arbor, MI (US); Andrew T. Waldis, Orion Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 106 days.

(21) Appl. No.: 14/050,719

(22) Filed: Oct. 10, 2013

(65) Prior Publication Data

US 2015/0105960 A1  Apr. 16, 2015

(51) Int. Cl.
*G05D 1/00* (2006.01)
*B60W 50/14* (2012.01)

(52) U.S. Cl.
CPC .............. *G05D 1/0061* (2013.01); *B60W 50/14* (2013.01); *G05D 2201/0213* (2013.01)

(58) Field of Classification Search
USPC ............................................................ 701/23
See application file for complete search history.

(56) References Cited

U.S. PATENT DOCUMENTS

| 6,707,421 | B1 * | 3/2004 | Drury et al. ............... 342/357.31 |
| 6,812,888 | B2 * | 11/2004 | Drury et al. ............... 342/357.31 |
| 8,135,539 | B2 * | 3/2012 | Nesbitt ....................... 340/995.1 |
| 8,275,307 | B2 | 9/2012 | Doyle, III |
| 2003/0018428 | A1 * | 1/2003 | Knockeart et al. ............ 701/210 |
| 2003/0055542 | A1 * | 3/2003 | Knockeart et al. .............. 701/26 |
| 2004/0104842 | A1 * | 6/2004 | Drury et al. ............... 342/357.13 |
| 2008/0027643 | A1 * | 1/2008 | Basir et al. ...................... 701/213 |
| 2010/0118147 | A1 * | 5/2010 | Dorneich et al. ............. 348/155 |
| 2011/0265003 | A1 * | 10/2011 | Schubert et al. .............. 715/716 |
| 2012/0290150 | A1 * | 11/2012 | Doughty et al. .................. 701/2 |

* cited by examiner

*Primary Examiner* — Shelley Chen
(74) *Attorney, Agent, or Firm* — Frank A. MacKenzie; Bejin Beineman PLC

(57) ABSTRACT

An event is detected arising during autonomous operation of a vehicle. An index in media content associated with the event is identified. At least one instruction is provided to a media module to pause or modify play of the media content based on the event.

20 Claims, 3 Drawing Sheets

AUTONOMOUS VEHICLE MEDIA CONTROL

BACKGROUND

A vehicle such as an automobile may be configured for autonomous driving operations. For example, the vehicle may include a central control unit or the like, i.e., a computing device having a processor and a memory, that receives data from various vehicle data collection devices such as sensors and generally also external data sources such as navigation information. The central control unit may then provide instructions to various vehicle components, e.g., actuators and the like that control steering, braking, acceleration, etc., to control vehicle operations without action, or with reduced action, by a human operator.

An autonomous vehicle may carry one or more occupants. The autonomous vehicle is operated partially or completely without action or control by a human operator. Therefore, the autonomous vehicle may not require attention of a driver or operator. Further, vehicle occupants including a driver or operator may play various types of media in the autonomous vehicle, e.g., audio, video, video games, etc.

DRAWINGS

DETAILED DESCRIPTION

System Overview

Figure 1:
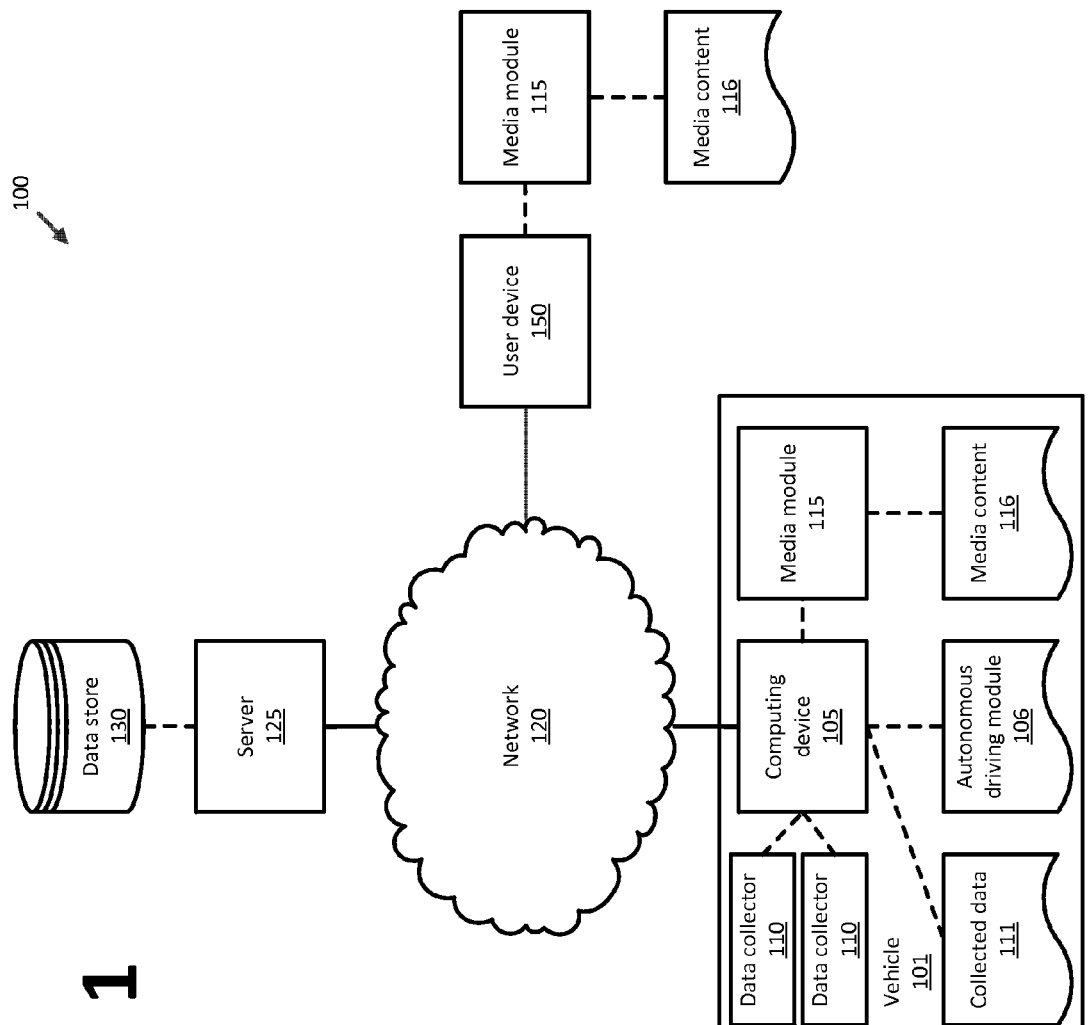
FIG. 1 is a block diagram of an exemplary autonomous vehicle system including monitoring and control of media playback in a vehicle.

FIG. 1 is a block diagram of an exemplary autonomous vehicle system 100 including media playback and media playback control mechanisms. A computer 105 may be configured for communicating with one or more remote sites such as a server 125 via a network 120, such remote site possibly including a data store 130. A vehicle 101 includes a vehicle computer 105 that is configured to receive information, e.g., collected data 111, from one or more data collectors 110 related to various components or conditions of the vehicle 101, e.g., components such as a steering system, a braking system, a powertrain, etc.

The computer 105 generally includes an autonomous driving module 106 that comprises instructions for autonomously, i.e., without operator input, operating the vehicle 101, using the collected data 111, in response to instructions received from a server 125, etc. Accordingly, the computer 105, e.g., in the module 106, generally includes instructions for receiving data, e.g., data 111 from one or more data collectors 110 and/or a human machine interface (HMI), such as an interactive voice response (IVR) system, a graphical user interface (GUI) including a touchscreen or the like, etc. The computer 105 may further receive information from the server 125, e.g., relating to road conditions, traffic conditions, weather conditions, a vehicle 101 route, etc.

The computer 105 may further include, or be communicatively coupled to a device that includes, a media module 115 for playing items of media content 116 in the vehicle 101. For example, a user device 150, e.g., a tablet computer, smart phone, or the like, could be used to play media content 116 in the vehicle 101. In any case, the computing device 105 may provide instructions to a media module 115 relating to playback of media content 116 in a display within the vehicle 101, e.g., a display of the computing device 105, the user device 150, etc. Further, when the computing device 105 detects one or more predetermined events, e.g., a change in vehicle 101 route, a change in, or unexpected, road or traffic conditions, a change in weather conditions, an unexpected change in operation of the vehicle 101 (e.g., an equipment or component failure or malfunction, a degraded signal from a sensor data collector 110, an accident, etc.) or some other event requiring attention of a vehicle 101 occupant, the computing device 101 may instruct the media module 115 to pause or modify playback of media content 116. Once a vehicle 101 occupant has been notified of an event and/or taken appropriate action and/or indicated that playback of media content 116 should resume, the computing device 105 may instruct the media module 115 to resume playback. Additionally or alternatively, playback of media content 116 may be paused or cease when autonomous driving operations are paused or cease.

Exemplary System Elements

A vehicle 101 generally includes a vehicle computer 105 that includes a processor and a memory, the memory including one or more forms of computer-readable media, and storing instructions executable by the processor for performing various operations, including as disclosed herein. Further, the computer 105 may include more than one computing device, e.g., controllers or the like included in the vehicle 101 for monitoring and/or controlling various vehicle components, e.g., an engine control unit (ECU), transmission control unit (TCU), etc. The computer 105 is generally configured for communications on a controller area network (CAN) bus or the like. The computer 105 may also have a connection to an onboard diagnostics connector (OBD-II). Via the CAN bus, OBD-II, and/or other wired or wireless mechanisms, the computer 105 may transmit messages to various devices in a vehicle and/or receive messages from the various devices, e.g., controllers, actuators, sensors, etc., including data collectors 110. Alternatively or additionally, in cases where the computer 105 actually comprises multiple devices, e.g., where a media player including the media module 115 is a separate device in the vehicle 101, the CAN bus or the like may be used for communications between devices represented as the computer 105 in this disclosure. In addition, the computer 105 may be configured for communicating with devices within and without the vehicle 101 via the network 120, which, as described below, may include various wired and/or wireless networking technologies, e.g., cellular, Bluetooth, wired and/or wireless packet networks, etc.

Generally included in instructions stored in and executed by the computer 105 is an autonomous driving module 106. Using data received in the computer 105, e.g., from data collectors 110, the server 125, etc., the module 106 may control various vehicle 101 components and/or operations without a driver to operate the vehicle 101. For example, the module 106 may be used to regulate vehicle 101 speed, acceleration, deceleration, steering, braking, including regular and emergency brakes, transmission control, operation of components such as lights, windshield wipers, etc. Further, the module 106 may include instructions for determining an occurrence of an event according to which playback of media content 116 should be modified or paused. In conjunction with determining such an event, the computer 105 may further include instructions to provide a message, e.g., an alert, via an HMI of the vehicle 101, and may yet further include instructions to receive vehicle 101 occupant input, e.g., to continue playback of media content 116, to halt playback of media content 116, etc.

Data collectors 110 may include a variety of devices. For example, various controllers in a vehicle 101 may operate as data collectors 110 to provide data 111 via the CAN bus, e.g., data 111 relating to vehicle speed, acceleration, etc. Further, sensors or the like, cameras, global positioning system (GPS) equipment, etc., could be included in a vehicle and configured as data collectors 110 to provide data directly to the computer 105, e.g., via a wired or wireless connection. Sensor data collectors 110 could include mechanisms such as RADAR, LADAR (also sometimes known as LIDAR), ultrasonic, etc. sensors that could be deployed to measure a distance between the vehicle 101 and other vehicles or objects.

A memory of the computer 105 generally stores collected data 111. Collected data 111 may include a variety of data collected in a vehicle 101. Examples of collected data 111 are provided above, and moreover, data 111 is generally collected using one or more data collectors 110 as described above, and may additionally include data calculated therefrom in the computer 105, and/or at the server 125. In general, collected data 111 may include any data that may be gathered by a collection device 110 and/or computed from such data. Accordingly, collected data 111 could include a variety of data related to vehicle 101 operations and/or performance, as well as data related to environmental conditions, road conditions, etc. relating to the vehicle 101.

Continuing with FIG. 1, the network 120 represents one or more mechanisms by which a vehicle computer 105 may communicate with a remote server 125. Accordingly, the network 120 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, IEEE 802.11, etc.), local area networks (LAN) and/or wide area networks (WAN), including the Internet, providing data communication services.

The server 125 may be one or more computer servers, each generally including at least one processor and at least one memory, the memory storing instructions executable by the processor, including instructions for carrying out various steps and processes described herein. The server 125 may include or be communicatively coupled to a data store 130 for storing collected data 111 and/or parameters 116. For example, collected data 111 relating to road conditions, weather conditions, etc. could be stored in the data store 130. Such collected data 111 from a vehicle 101 could be aggregated with collected data 111 from one or more other vehicles 101 by the server 125, and used for the server 125 to provide instructions to one or more vehicles 101 concerning autonomous operations and/or to provide information such as traffic data or the like to the computer 105.

The media module 115 generally includes instructions stored in a computer memory and executable by a computer processor to play media content 116 on a display in the vehicle 101, e.g., a display of the computing device 105, user device 150, etc. The media module 115 may be included in the computer 105 or in a separate device communicatively coupled to the computer 105. In any case, the media module 115 may receive instructions from the computer 105 to pause, modify, resume, or otherwise control playback of media content 116. Note that as used herein, "playback" can mean playing recorded content 116, streaming live content 116 and/or content 116 downloaded via the network 120 on a real-time or near real-time basis, presenting content 116 as part of a video game, virtual reality, or the like, etc.

Media content 116 is generally in a digital format, e.g., compressed audio and/or video data. The media content 116 generally includes, according to such digital format, metadata or the like in addition to data, e.g., MPEG frames, used to render a media presentation. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content 116 may be provided in a format such as the MPEG-1, MPEG-2 or the H.264/MPEG-4 Advanced Video Coding standards (AVC) (H.264 and MPEG-4 at present being consistent), or according to some other standard or standards. For example, media content 116 could be audio data formatted according to standards such as MPEG-2 Audio Layer III (MP3), Advanced Audio Coding (AAC), etc.

Further, the foregoing standards generally provide for including metadata in a file of media content 116. Media content 116 metadata may be used to identify indices or locations such as timestamps, frame numbers, etc. in the media content 116. Such indices may be used to access one or more portions of media data 116, e.g., such as may be specified according to pointers or the like indicated by instructions in the computer 105 and/or stored in a memory of the computer 105.

Figure 2:
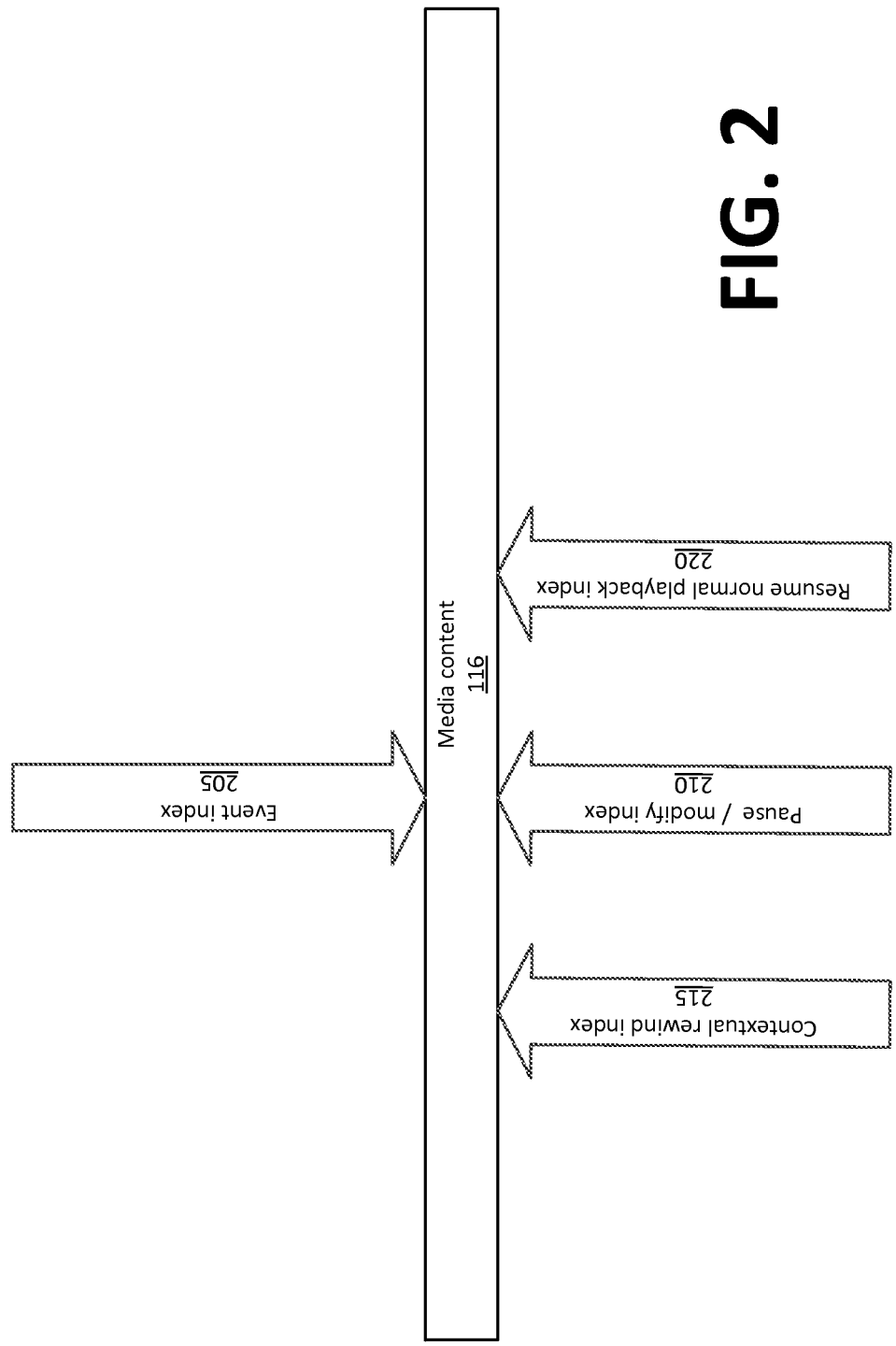
FIG. 2 is a block diagram of media content with respect to an event.

For example, FIG. 2 is a diagram of media content 116 with respect to an event 205 that may be determined by the computer 105. That is, the computer 105 may determine the occurrence of an event, and may note a location, e.g., according to an index, in the media content 116. The event index 205 may substantially coincide with a pause or modify index 210. That is, playback of media content 116 may be paused or modified at a location in the media content 116 contemporaneous with, or substantially contemporaneous with, a location of the media content 116 being played back at a time when the event arose.

Other indices may also be noted by the computer 105 with respect to the media content 116. For example, the computer 105 may include instructions to identify a contextual rewind index 215, that is, a location in the media content 116 prior to the location where playback was paused or modified from which playback of media content 116 should be re-started after having been paused for an event. A contextual rewind index 215 could be determined according to a number of seconds, a number of frames, etc. prior to a pause or modify location 210, and included in instructions of the computer 105. Alternatively or additionally, media content 116 metadata could include information for determining a contextual rewind index 215 for a particular item of media content 116. The computer 105 could then determine, e.g., using an offset provided in the media content 116 metadata, an appropriate contextual rewind index 215.

Further, in a case where media content 116 playback was modified rather than paused, e.g., where sound in video media content 116 was muted, a resume normal playback index 220 may specify a location where sound may be restored to the video. For example, sound could be muted to provide an informational alert in the case of an event 205 that a vehicle 101 occupant may wish to be advised of, but that does not necessitate complete attention or possible control of the vehicle 101 by an occupant. Accordingly, sound in a video item of media content 116 could be muted between a modify index 210 and a resume normal playback index 220.

Continuing with FIG. 1, a user device 150 may be any one of a variety of computing devices including a processor and a memory, as well as communication capabilities. For example, the user device 150 may be a portable computer, tablet computer, a smart phone, etc. that includes capabilities for wireless communications using IEEE 802.11, Bluetooth, and/or cellular communications protocols. Further, the user device 150 may use such communication capabilities to communicate via the network 120 and also directly with a vehicle computer 105, e.g., using Bluetooth. Accordingly, a user device 150 may be used to carry out certain operations herein ascribed to a data collector 110, e.g., voice recognition functions, cameras, global positioning system (GPS) functions, etc., in a user device 150 could be used to provide data 111 to the computer 105. Further, a user device 150 could be used to provide a human machine interface (HMI) to the computer 105. Moreover, a user device 150 could carry out operations of a media module 115, including playing media content 116.

Exemplary Process

Figure 3:
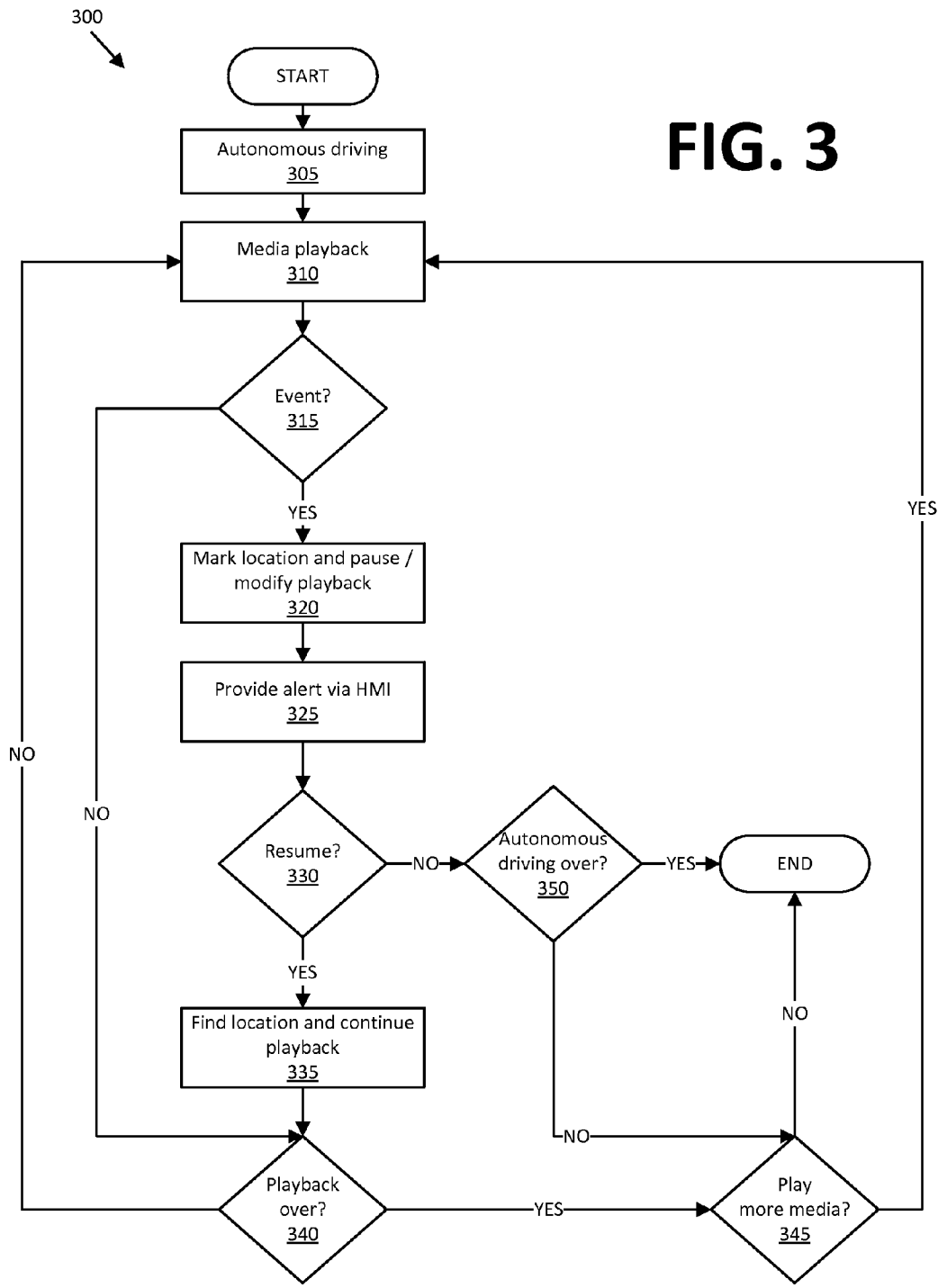
FIG. 3 is a diagram of an exemplary process for monitoring and controlling media playback in an autonomous vehicle.

FIG. 3 is a diagram of an exemplary process for monitoring and controlling media playback in an autonomous vehicle.

The process 300 begins in a block 305, in which the vehicle 101 conducts autonomous driving operations, i.e., operation of the vehicle 101 is performed in a manner partially or completely controlled by the autonomous driving module 106. For example, all vehicle 101 operations, e.g., steering, braking, speed, etc., could be controlled by the module 106 in the computer 105. However, it is also possible that, in the block 305, the vehicle 101 may be operated in a partially autonomous (i.e., partially manual fashion, where some operations, e.g., braking, could be manually controlled by a driver, while other operations, e.g., steering, could be controlled by the computer 105.

Following the block 305, in a block 310, the media module 115, e.g., according to instructions in the computer 105, user device 150, separate media player in the vehicle 101, etc., conducts playback of media content 116. For example, the computer 105 could include or be connected to a media player, e.g., an audio player, video player, etc., in the vehicle 101. Alternatively or additionally, a user device 150 could establish communication with the computer 105, e.g., via a wireless networking technology such as Bluetooth, etc., whereupon the user device 150 could perform playback of media content 116. In any event, the computer 105 is generally configured to provide instructions to control playback of media content 116 in the vehicle 101 as described herein.

Following the block 310, in a block 315, the computer 105 determines whether an event has occurred warranting pause or modification of playback of media content 116. An event could be triggered in a variety of ways. For example, a navigation module included in, or in communication with, the computer 105 could determine that the vehicle 101 was nearing a point in a route demanding vehicle 101 occupant attention and/or for which autonomous vehicle operations may not be possible, etc., e.g., approaching intersection, entering severe traffic, entering an exit ramp of a freeway, approaching severe weather, entering a driveway, etc. Alternatively or additionally, an event could be triggered by information and/or instructions from the server 125. For example, where the server 125 is responsible for providing instructions to the vehicle 101 for autonomous operations, the server 125 could provide an instruction for manual control of the vehicle 101 to be resumed, which would be an event warranting pause of playback of media content 116.

In general, a "pause event" is an event requiring vehicle 101 occupant attention and possibly transition to manual control of vehicle 101. A "modify event" is an event concerning which vehicle 101 occupant attention and notification is desirable, warranting modifying playback of media content 116 to make the playback less intrusive than it would otherwise be but not ceasing the playback altogether. Further, the nature of an event could be determined from a type of media content 116 being played back. For example, media content 116 could include sound and/or images related to a videogame. In the case of content 116 such as a video game where modifying the content 116, e.g., to suppress some or all of the content 116, could interfere with the user's ability to properly and completely enjoy the content, e.g., play the videogame, all events for the content 116 could be pause events.

Further, in some implementations, a "pause event" may be dependent on a location in the vehicle 101 at which media content 116 is being played. For example, where media content 116 is being played in a back seat, passenger seat, etc., the media content 116 may not be subject to a pause event. On the other hand, where the media content 116 is being played at an operator's position, is audio content played through speakers in the vehicle 101 cabin, etc., then the media content 116 may be subject to a pause event.

If an event is identified in the block 315, then the process 300 proceeds to a block 320. Otherwise, a block 340 is executed next. In the block 320, the computer 105 identifies an index or location 205 in the media content 116 related to the event. As noted above, such event index 205 is generally substantially the same as a pause or modify index 210, i.e., media content 116 is generally paused as soon as the computer 105 recognizes an event.

Following the block 320, in a block 325 the computer 105 generally provides a message or alert to a user via a human machine interface (HMI) included in the vehicle 101 and/or via a user device 150. For example, the message or alert may indicate the nature of the event detected as described above in the block 315, e.g., heavy traffic, route changing, freeway exit approaching, etc. Further, the message or alert may request user input. For example, a user may be able to provide inputs concerning whether to assume manual control of the vehicle 101, resume playback of the media content 116, specify a location in the media content, e.g., a time index or the like, at which playback should be resumed, etc. The options concerning which the user can provide input may be varied depending on the type of media. For example, if the user is listening to or watching streaming media 116 such as a live sporting event, a vehicle 101 HMI could provide the option to resume the media feed where it was paused, e.g., at the index 210, at some point prior to where it was paused, e.g., at an index 215, or to resume streaming the media content 116 at the current point in a live feed, e.g., at an index 220. Not all options make sense for all types of streaming media 116; for example, a user viewing a movie would not be given an option to resume a current live feed. Likewise, in the case of a video game or the like, pausing and resuming at a pause index 210 may be the only option.

Following the block 325, in a block 330, the computer 105 determines whether playback of the media content 116 should be resumed. For example, a user may provide input to resume playback, a time for which media content 116 playback should be modified, e.g., a time when a video should be muted, as specified in instructions of the computer 105 in conjunction with a particular event, may have elapsed, etc. If playback of the media content 116 is not to be resumed, e.g., based on user input, because autonomous vehicle 101 operations have ceased, etc., then the process 300 proceeds to a block 350. Otherwise, the process 300 proceeds to a block 335. Depending on a type of media content 116, playback could also be resumed upon the user taking over control of driving the vehicle 101. For example, playback of audio content 116 could be resumed when the driver takes over control. Alternatively, upon playback of a sporting event, movie, or the like, an HMI in the vehicle 101 could provide an option to resume an audio-only portion of the content 116. Alternatively or additionally, where a second person, i.e., a passenger in addition to a vehicle 101 operator, is present, the HMI could provide the option for the second person to take control of the media playback device to resume video as well as audio portions of content 116 if the driver takes back control of the vehicle 101.

In the block 335, the computer 105 determines a location at which to resume playback of media content 116. (In this context, resuming playback of media content 116 includes restoring a portion of media content 116 that may have been suppressed in conjunction with an event, e.g., restoring sound, color to video, etc.). Generally, as explained above, such location may be determined according to a type of media content 116 and/or a type of event according to which instructions in the computer 105 may specify a contextual rewind index 215, a resume a normal playback index 220, or simply resuming playback 116 from a pause or modify index 210. In any case, playback of media content 116 generally begins at the determined location in the block 335. It will be apparent that, accordingly, many implementations include creating a buffer to store media content 116 while it is paused so that playback can be resumed at a selected index.

Following the block 335, in a block 340, the computer 105 determines whether playback of the media content 116 is completed. If not, the process 300 returns to the block 310. However, if playback of the media content 116 is completed, then a block 345 follows the block 340.

In the block 345, the computer 105 determines whether additional media content 116, e.g., another item of media content 116 such as a song, movie, etc., is to be played. If so, the process 300 returns to the block 310 for playback of such media content 116. Otherwise, the process 300 ends.

The block 350 may follow the block 330. In the block 350, the computer 105 determines whether playback of media content 116 has ceased because the vehicle 101 has ceased autonomous driving operations. If not, i.e., if autonomous driving operations are still being conducted, then the process 300 proceeds to the block 345. Otherwise, the process 300 ends.

Conclusion

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, C#, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer comprising a processor and a memory, wherein the computer is configured to:
provide instructions for autonomous operation of a vehicle;
detect an event indicating transition from autonomous operation of the vehicle to non-autonomous operation of the vehicle;
identify an index in media content associated with the event indicating the transition from autonomous to non-autonomous operation of the vehicle; and
provide at least one instruction to a media module to pause or modify play of the media content based on the event indicating the transition from autonomous to non-autonomous operation of the vehicle.

2. The system of claim 1, wherein the computer is further configured to identify an index in the media content for resuming play of the media content.

3. The system of claim 1, wherein the computer is further configured to instruct the media module to pause play of the media content upon cessation of autonomous operation of the vehicle.

4. The system of claim 1, wherein the computer is further configured to provide a message via a human machine interface related to the event.

5. The system of claim 1, wherein the instruction to the media module is an instruction to mute sound associate with the media content.

6. The system of claim 1, wherein the event is related to at least one of a route, a road condition, a weather condition, and a vehicle component malfunction.

7. The system of claim 1, wherein the instruction to the media module is based in part of a location of media playback in the vehicle.

8. The system of claim 1, wherein the media module is included in the computer.

9. A computer-readable medium having tangibly embodied thereon instructions executable by a computer processor, the instructions comprising instructions to:
   provide instructions for autonomous operation of a vehicle;
   detect an event indicating transition from autonomous operation of the vehicle to non-autonomous operation of the vehicle;
   identify an index in media content associated with the event indicating the transition from autonomous to non-autonomous operation of the vehicle; and
   provide at least one instruction to a media module to pause or modify play of the media content based on the event indicating the transition from autonomous to non-autonomous operation of the vehicle.

10. The medium of claim 9, the instructions further comprising instructions to identify an index in the media content for resuming play of the media content.

11. The medium of claim 9, the instructions further comprising instructions to instruct the media module to pause play of the media content upon cessation of autonomous operation of the vehicle.

12. The medium of claim 9, the instructions further comprising instructions to provide a message via a human machine interface related to the event.

13. The medium of claim 9, wherein the instruction to the media module is an instruction to mute sound associate with the media content.

14. The medium of claim 9, wherein the event is related to at least one of a route, a road condition, a weather condition, and a vehicle component malfunction.

15. The medium of claim 9, wherein the instruction to the media module is based in part of a location of media playback in the vehicle.

16. A method, comprising:
   providing instructions for autonomous operation of a vehicle;
   detecting an event indicating transition from autonomous operation of the vehicle to non-autonomous operation of the vehicle;
   identifying an index in media content associated with the event indicating the transition from autonomous to non-autonomous operation of the vehicle; and
   providing at least one instruction to a media module to pause or modify play of the media content based on the event indicating the transition from autonomous to non-autonomous operation of the vehicle.

17. The method of claim 16, the instructions further comprising instructions to identify an index in the media content for resuming play of the media content.

18. The method of claim 16, the instructions further comprising instructions to instruct the media module to pause play of the media content upon cessation of autonomous operation of the vehicle.

19. The method of claim 16, wherein the event is related to at least one of a route, a road condition, a weather condition, and a vehicle component malfunction.

20. The method of claim 16, wherein the instruction to the media module is based in part of a location of media playback in the vehicle.

\* \* \* \* \*